United States Patent
Tamizkar

(10) Patent No.: US 11,463,308 B2
(45) Date of Patent: Oct. 4, 2022

(54) METHOD AND A SYSTEM FOR ROUTING DATA PACKETS TO/FROM A SUBNET OF A HOME NETWORK TO A VISITED NETWORK

(71) Applicant: Telia Company AB, Solna (SE)

(72) Inventor: Babak Tamizkar, Stockholm (SE)

(73) Assignee: Telia Company AB

( * ) Notice: Subject to any disclaimer, the term of this patent is extended or adjusted under 35 U.S.C. 154(b) by 0 days.

(21) Appl. No.: 17/202,556

(22) Filed: Mar. 16, 2021

(65) Prior Publication Data

US 2021/0297313 A1 Sep. 23, 2021

(30) Foreign Application Priority Data

Mar. 23, 2020 (SE) .................................. 2050312-4

(51) Int. Cl.
| | |
|---|---|
| *G06F 15/177* | (2006.01) |
| *H04L 41/0813* | (2022.01) |
| *H04L 45/02* | (2022.01) |
| *H04L 61/5007* | (2022.01) |
| *H04L 61/5084* | (2022.01) |

(52) U.S. Cl.
CPC .......... *H04L 41/0813* (2013.01); *H04L 45/02* (2013.01); *H04L 45/04* (2013.01); *H04L 61/5007* (2022.05); *H04L 61/5084* (2022.05)

(58) Field of Classification Search
CPC ............................ H04L 45/04; H04L 61/2084
USPC ......................................................... 370/254
See application file for complete search history.

(56) References Cited

U.S. PATENT DOCUMENTS

| | | | |
|---|---|---|---|
| 9,942,148 B1 | 4/2018 | Sivaramakrishnan et al. | |
| 2002/0026527 A1* | 2/2002 | Das ..................... | H04L 61/2514 |
| | | | 709/202 |
| 2002/0069278 A1 | 6/2002 | Forsloew | |

(Continued)

FOREIGN PATENT DOCUMENTS

| | | |
|---|---|---|
| WO | WO 2014/117475 A1 | 8/2014 |
| WO | WO 2017/171743 A1 | 10/2017 |

OTHER PUBLICATIONS

Swedish Search Report from the Swedish Patent and Registration Office, Feb. 4, 2021, for Swedish Patent Application 2050312-4.

(Continued)

*Primary Examiner* — Hee Soo Kim
(74) *Attorney, Agent, or Firm* — Burr & Forman LLP; Jeffrey H. Kamenetsky

(57) ABSTRACT

A method and a system for enabling routing of traffic to/from a roaming host node roaming from a subnet of a home network to a visited network, the roaming host node assigned an IP address in the home network. The method comprises configuring, in a router of the visited network to which the roaming host node is connected, a subnet by assigning an IP address range to the subnet, the assigned IP address range being the same IP address range of the subnet of the home network; creating/configuring a tunnel between a router of the home network and the router of the visited network; and creating/configuring, in the router of the home network, a static route to route traffic destined to the roaming host node the traffic is routed through the tunnel, the IP address of the roaming host node being maintained unchanged in the subnet of the visited network.

10 Claims, 3 Drawing Sheets

(56) References Cited

U.S. PATENT DOCUMENTS

| | | | |
|---|---|---|---|
| 2002/0080752 A1* | 6/2002 | Johansson | H04L 61/2517 |
| | | | 370/338 |
| 2004/0013118 A1 | 1/2004 | Borella | |
| 2005/0074015 A1* | 4/2005 | Chari | H04L 12/2856 |
| | | | 370/400 |
| 2008/0071890 A1* | 3/2008 | Meier | H04L 61/5014 |
| | | | 709/220 |
| 2009/0129386 A1* | 5/2009 | Rune | H04L 12/4641 |
| | | | 370/392 |
| 2012/0008630 A1 | 1/2012 | Ould-Brahim | |
| 2012/0039230 A1* | 2/2012 | Blanchette | H04L 45/66 |
| | | | 370/312 |
| 2012/0281630 A1 | 11/2012 | Liu et al. | |
| 2017/0346686 A1 | 11/2017 | Mudigonda | |
| 2018/0376412 A1* | 12/2018 | Bischinger | H04W 48/18 |
| 2019/0239125 A1* | 8/2019 | El-Rashidy | H04W 8/087 |

OTHER PUBLICATIONS

Extended Search Report dated Nov. 2, 2021, European Patent Office, European Patent Application No. 21163059.5, Telia Company AB.

* cited by examiner

METHOD AND A SYSTEM FOR ROUTING DATA PACKETS TO/FROM A SUBNET OF A HOME NETWORK TO A VISITED NETWORK

TECHNICAL FIELD

The present disclosure relates generally to the field of data communications, and more particularly to a method and a system for routing data packets or traffic in a network topology including multiple subnetworks.

BACKGROUND

Many networks include multiple subnetworks and data centers including a plurality of network nodes, such as servers, and often the nodes need to communicate with one another. Additionally, in such networks, it may be desirable to move a node from a subnet in a home network to a subnet in another network, or to move from its original location to another location either physically or logically. One reason may be due to migration of servers from one location to another location while still providing the services to users. For example, an Internet server may provide services such as servicing and managing requests for hypertext mark-up language (HTML) Web pages, providing and managing access to databases, providing and managing access to News servers, Multimedia (including video and audio) servers, and Mail servers, as well as managing access to and functioning of e-commerce services. Some servers route such requests to an appropriate computer within a cluster of computers, each of which performs one of these server functions.

It is however a challenging task in networking to move one or more host nodes or servers from one subnet to another subnet while allowing the subnets to continue to work seamlessly, and host nodes in different subnets to communicate with each other after the move. One of the challenges is how to allow the host node in a home network to keep its Internet Protocol (IP) address unchanged even after the move of the host node to a visited network

SUMMARY

It is an object of embodiments herein to provide a solution for routing traffic and support moving a host node or a server from one subnet to another subnet while the IP address of the host node remains unchanged in both subnets, i.e., the host node keeps its original IP address even after moving or roaming to a new subnet in a visited network.

According to an aspect of embodiments herein, there is provided a method for enabling routing of traffic to/from a roaming host node roaming from a subnet of a home network to a visited network, wherein the roaming host node is assigned an IP address in the home network, the method comprising: configuring, in a router of the visited network to which the roaming host node is connected, a subnet by assigning an IP address range to the subnet, wherein the assigned IP address range is the same IP address range of the subnet of the home network; creating or configuring a tunnel between a router of the home network and the router of the visited network; and creating or configuring, in the router of the home network, a static route to route traffic destined to the roaming host node wherein the traffic is routed through the tunnel, and wherein the IP address of the roaming host node is maintained unchanged in the subnet of the visited network.

According to another aspect of embodiments herein, there is provided a system for enabling routing of traffic to/from a roaming host node roaming from a subnet of a home network to a visited network, wherein the roaming host node is assigned an IP address in the home network, the system comprising a router in the visited network to which the roaming host node is connected, and further comprises a router in the home network; wherein the router of the visited network is adapted to configure a subnet by assigning an IP address range to the subnet, wherein the assigned IP address range is the same IP address range of the subnet of the home network; create or configure a tunnel between a router of the home network and the router of the visited network; and the router of the home network is adapted to create or configure a static route to route traffic destined to the roaming host node wherein the traffic is routed through the created or configured tunnel, and wherein the IP address of the roaming host node is maintained unchanged in the subnet of the visited network.

An advantage with embodiments herein is to allow for a seamless mobility of a node from one subnet to another subnet while maintaining the IP address of the host node unchanged.

Additional advantages achieved by the embodiments of the present invention will become apparent from the following detailed description when considered in conjunction with the accompanying drawings.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

It should be noted that the embodiments herein may be employed in any network involving any number router devices, subnets, host nodes etc. Also, any suitable routing protocol may be used.

Figure 1:
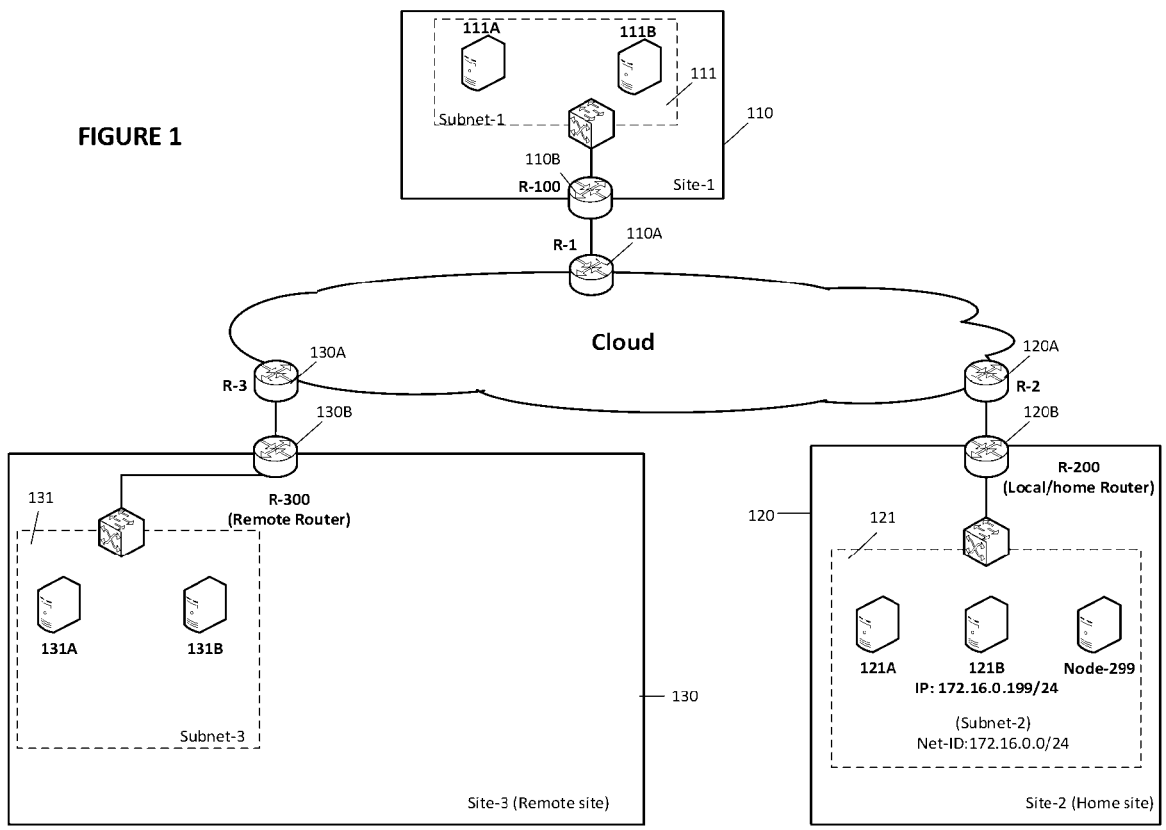
FIG. 1 is an example of a network scenario involving routers, network host nodes and subnets.

Reference is now made to FIG. 1 which is a simplified drawing illustrating a communication network including a plurality of sites, servers or host nodes, subnets and routers.

As seen in FIG. 1, three networks or three sites: Site-1 110, Site-2, 120, Site-3 130 are connected to each other by means of router devices and communicably connected to each other via the cloud. Each site is shown including a subnet which in turn includes servers or host nodes. Instead of a cloud, a wide area network (WAN) may be used. Sites 110, 120 and 130 are connected to the cloud through one or more routers. For example, Site-1 110, Site-2 120 and Site-3 130 are connected to the cloud through routers 110A, 120A and 130A respectively. Each site includes one or more subnets. Site-1 110 includes Subnet-1 111, Site-2 120 includes Subnet-2 121 and Site-3 is shown including Subnet-3 131. The subnets are shown connected through one or more switches and routers 110B (R-100), 120B (R-200) and 130B (R-300), to the cloud.

Each subnet includes one or more host nodes, and each subnet has a unique IP address range. The host nodes in a subnet are assigned an IP address within the IP address range of the subnet. As shown, Subnet-1 110 includes two host nodes (or servers) 111A and 111B. Subnet-2 120 includes three host nodes 121A, 121B and 121C, and Subnet-3 130 includes two host nodes 131A and 131B.

It is appreciated that the embodiments herein are not restricted to any number of sites, host nodes, routers, etc.

Assuming now that host node 121B in subnet-2 121 of Site-2 120 roams to Site-3 130. For easier understanding the teaching of the embodiments herein, the following terminology is used:

Home network: This is the original place of host node 121B in subnet 121, i.e., before the roaming takes place. The home network (or home site) corresponds to Site-2 120. An example of the IP address range of subnet 121 is also shown (172.16.0.0/24). This may also be called a Net-ID. The IP address of host node 121B in the home network is also given 172.16.0.199/24.

Visited network: This is the place to which the host node 121B roams to. The visited network corresponds to Site-3 130. The visited network may also be called a remote site.

Roaming host node: This corresponds to host node 121B after it has roamed from the home network to the visited network.

Router of the home network: This corresponds to router 120B in Site-2 120. This may also be called the local router or the home router.

Router of the visited network: This corresponds to router 130B in Site-3 130. This may be called the remote router.

Figure 2:
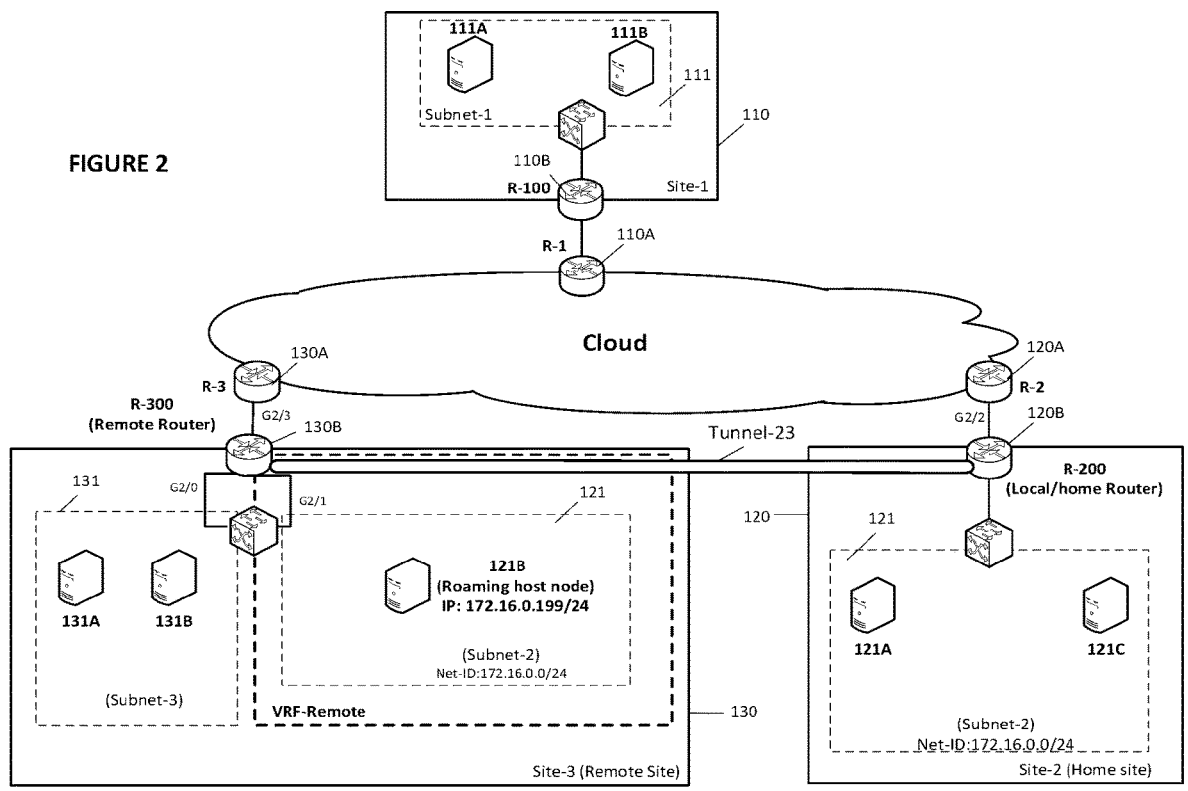
FIG. 2 is another example of a network scenario or system involving routers, network host nodes and subnets wherein the embodiments herein may be applied.

FIG. 2 illustrates the communication network of FIG. 1 after the roaming of host node 121B from the home network 120 to the visited network 130. Hence host node 121B is connected to the visited network or to the router of the visited network. It should be noted that although there are no "lines" showing connection(S) of the host nodes to the respective router(s), directly or via switch devices, it is understood that the host devices are connectable or are connected to respective router directly or indirectly via a switch device. For example, the roaming host node 121B is connectable to the router 130B of the visited network 130 either directly or via a switch or suitable network device. The same applies for the other host nodes and there connections to respective router (directly or indirectly).

According to an embodiment herein, the method includes configuring, in the router 130B of the visited network 130, a subnet by assigning an IP address range, wherein the IP address range is the same as the IP address range of the subnet 121 of the home network 120. Hence, the assigned IP address range to this new subnet is 172.16.0.0/24. This new subnet hence can be denoted Subnet-2 121 because it has the same IP range as subnet 121 of the home network 120. The roaming host node 121B keeps it original IP address 172.16.0.199 in this new subnet 121. This is shown in FIG. 2 wherein the roaming host node 121B maintains it IP address unchanged within the new subnet 121 in the visited network 130.

There are several reasons why the roaming host node should keep its IP address unchanged. For example, if the roaming host node is a DNS (Doman Name System) server, it is important that the IP address of this server is kept unchanged, otherwise the IP configuration in each client using the IP address of this DNS server must be updated and usually this needs to be done manually, which is cumbersome and time consuming for the users. Another reason could be that applications and licenses installed in the host node are tied to the IP address of the host node. Hence, if the IP address of the host node changes, the applications may not work anymore, or the license(s) may not be valid anymore.

According to embodiments herein, a tunnel is created between the router 120B of the home network 120 and the router 130B of the visited network 130, and a static route is configured or created in the router 120B of the home network 120 to point to the tunnel and to route traffic destined to the roaming host node 121B, through the created tunnel. The tunnel, denoted Tunnel-23 is illustrated in FIG. 2.

An example of the configuration of the static route in the home router 120B (R-200), used to route packets to the roaming host node 121B through Tunnel-23 is shown below:
R-200 #
ip route 172.16.0.199/32→Tunnel23

Hence, when the router 120B of the home network receives traffic destined to the roaming host node 121B, the traffic is routed through the Tunnel-23 and when it reaches the router 130B of the visited network 130 and since the destination IP address of the roaming host node 121B is part of the subnet 121 in the visited network 130, the traffic is delivered to the roaming host node 121B.

For example, assume host node 111A in Site-1 110 sends traffic destined to the roaming host node 121B. When traffic reaches the router 120B of the home network, this router checks if the destination IP address matches with any of the IP addresses defined in the static route. That being the case, the router 120B of the home network forwards the traffic (or packet) through the tunnel and when it arrives at the routed 130B of the visited network, this router forwards the traffic or packet to the interface which the subnet 121, in the visited network 130, is connected to (e.g., interface G2/1) and the roaming host node 121B receives the traffic or packet. G2/2 is the interface used to connect the home router 120B to the cloud.

Assume that source host node (e.g., 121A) in the home network 120 wants to communicate with the destination host node (roaming host node 121B) having address 172.16.0.199, and the source host node 121A generates an ARP (Address Resolution Protocol) request. The source node 121A is in subnet 172.16.0.0/24 of the home network 120. The destination host node 121B is also in subnet 172.16.0.0/24 but in the visited network 130. These two host nodes are then considered to belong to the same subnet (172.16.0.0/24) and therefore this subnet is denoted 121 in both the home network 120 and in the visited network 130.

Normally, a router accepts an ARP request if the router sees its own Medium Access Medium (MAC) address in the destination part of the ARP request, or the destination address indicated in the ARP request include a broadcast address (e.g. FF:FF:FF:FF:FF:FF) while the router has a route in its routing table to the destination IP address indicated in the ARP request.

According to embodiments herein, since a static route is created or configured in the home router 120B, this router accepts the ARP request packet and forwards it through Tunnel-23 based on this created static route:
ip route 172.16.0.199/32→Tunnel23.

The packet reaches router 130B (R-300) of the visited network 130 and since the destination IP address (172.16.0.199 is within the IP address range of the subnet 172.16.0.0/24 in the visited network), the router 130B forwards the packet to the roaming host node 121B using interface G2/1. The IP address range of subnet 172.16.0.0/24 is (172.16.0.1) to (172.16.0.254).

According to another embodiment, in order for the roaming host node 121B to send traffic to a host node in the subnet 121 of the home network 120, a static route is created or configured in the router 130B of the visited network 130. For example, the roaming host node 121B wants to send traffic to host node 121A in subnet 121 of the home network 120. For any traffic destined to host node 121A, the traffic originated from the roaming host node 121B reaches the router 130B of the visited network 130 which sends the traffic using the static route created in router 130B of the visited network 130 through Tunnel-23. When the traffic reaches router 120B of the home network 120, the traffic is forwarded to the IP destination address of host node 121A.

In case the roaming host node 121B wants to communicate with another host node (e.g., host node 121C) in the subnet 121 of the home network 120, an additional static route may be configured in the router 130B of the visited network 130. In other words, for each host node in the subnet 121 of the home network 120, a static route is added in the router 130B of the visited network 130. This approach works well but may not be scalable when the number of host nodes in the home network is large, if, for example, the roaming host node 121B wants to communicate with several host nodes in the subnet 121 of the home network.

One approach would be to have a subnet as a destination "target" instead of adding several individual static routes for each host node. According to an embodiment, a static route may be created or configured in the router 130B of the visited network 130, to route traffic, destined to a host node in the subnet 121 of the home network 120, through Tunnel-23. There are however conditions to be met for this approach to work, which are presented below.

Condition 1

The first condition is that the static route should indicate a subnet within the IP address range of the subnet 121 of the home network 120. This means that the subnet should be a sub-subnet of subnet 121.

As an example, if the subnet 121 of the home network (or similarly the subnet 121 of the visited network 130) has an IP address range 172.16.0.0/24, the sub-subnet should have an IP address range within this subnet. For example, the IP address of the sub-subnet can be 172.16.0.0/25 or 172.16.0.0/26 etc.

Condition 2

The second condition is that the IP address of one or more host nodes in the subnet 121 of the home network 120 should be part of the IP address range of the sub-subnet.

Condition 3

The third condition is that the IP address of the roaming host node 121B should not be part of the IP address range associated with the sub-subnet, i.e., the IP address range of the sub-subnet indicated in the static route. The IP address of the roaming host node 121B is (172.16.0.199).

For example, assume that the roaming host node 121B (IP address 172.16.0.199) and (destination) host node 121C (e.g., IP address 172.16.0.20) want to communicate with each other.

In the following, four examples of a static route are presented and the three conditions above are used to demonstrate which of these static routes that can be created or configured in the router (R-300) 130B of the visited network.

It is appreciated that the examples herein are not restrictive to the embodiments herein.

Example 1

R-300 #
ip route 172.16.0.0/25→Tunnel23

Example 2

R-300 #
ip route 172.16.0.128/25→Tunnel23

Example 3

R-300 #
ip route 172.16.0.0/26→Tunnel23

Example 4

R-300 #
ip route 172.16.0.0/26→Tunnel23

As shown in the examples above, all the static routes indicate a subnet within the IP address range of the subnet 121 of the home network 120. This means that the subnet indicated in the static route is a sub-subnet of subnet 121. Hence the first condition is met. Regarding conditions 2 and 3, we need to know if they are met:

Example 1

R-300 #
ip route 172.16.0.0/25→Tunnel23
The IP address range of the sub-subnet 172.16.0.0/25 indicated in this static route is: (172.16.0.1) to (172.16.0.127).

Condition 2 is met because the destination host node 121C with IP address (172.16.0.20) is within the IP address range of this sub-subnet.

Condition 3 is also met because the IP address of the roaming host node 121B is (172.16.0.199) is not part of this sub-subnet.

Example 2

R-300 #
ip route 172.16.0.128/25→Tunnel23
The IP address range of the sub-subnet 172.16.0.128/25 indicated in this static route is: (172.16.0.129) to (172.16.0.254).

Condition 2 is not met because the destination host node 121C with IP address (172.16.0.20) is not within the IP address range of this sub-subnet.

Condition 3 is also not met because the IP address of the roaming host node is (172.16.0.199) is part of this sub-subnet.

Example 3

R-300 #
ip route 172.16.0.0/26→Tunnel23

The IP address range of the sub-subnet 172.16.0.0/26 indicated in this static route is: (172.16.0.1) to (172.16.0.63).

Condition 2 is met because the destination host node 121C with IP address (172.16.0.20) is within the IP address range of this sub-subnet.

Condition 3 is also met because the IP address of the roaming host node is (172.16.0.199) is not part of this sub-subnet.

Example 4

R-300 #
ip route 172.16.0.64/26→Tunnel23

The IP address range of the sub-subnet 172.16.0.64/26 indicated in this static route is: (172.16.0.65) to (172.16.0.127).

Condition 2 is not met because the destination host node 121C with IP address (172.16.0.20) is not within the IP address range of this sub-subnet.

Condition 3 is met because the IP address of the roaming host node is (172.16.0.199) is not part of this sub-subnet.

As demonstrated above, the static routes according to examples 1 and 3 fulfill the requirements the three conditions.

VRF (Virtual Routing and Forwarding) is a technology implemented in a network apparatus or in a network device such as a router device that enables the creation of operation of multiple instances of a routing table simultaneously. VRF enables the router to configure the instances of router within it, each of which operates separately and has its distinct and overlapping set of Internet Protocol (IP) addresses. VRF can also be called Virtual Router and Forwarder. VRF works like a typical router with its unique routing table, table entries and routing protocols and may also be used to create VPN (Virtual Private Network) tunnels.

According to yet another embodiment, the solution according to the method herein may further comprise, creating or configuring a VRF in the router 130B of the visited network 130; assigning an interface of the router 130B to the VRF; assigning a tunnel end point on the router 130B of the visited network 130 to the VRF; and importing routes from at least one routing table of the router 130B of the visited network 130 to a VRF table. However, none of the other interfaces in the router 130B should be part of this VRF. In FIG. 2, interface G2/1 is shown under this VRF. Also, the subnet 121 in the visited network 130 should be layer 3 isolated from any other subnet connected to the same router 130B of the visited network 130, either physically or logically. In FIG. 2, the created or configured VRF is denoted VRF-Remote. One reason to create the VRF is to isolate the routing table which interface G2/1 is part of that, from the rest of the routing table in the router R-300 130B, if e.g. any other directly connected subnet on router 130B wants to communicate with a host node subnet-2 121 in site 120 (home site or home network).

As mentioned above, VRF-Remote imports routes from the routing table of router 130B of the visited network, which has the default gateway to the cloud or has a route to router 120B (R-200). For example, G2/3 is the interface having the gateway to the cloud or the route to router 120B (R-200). This interface can be part of either the global routing table or a separate VRF. VRF-Remote may also import routes from other routing table(s).

The following command shows an example of how VRF-Remote is configured in the router 130B of the visited network 130 and an example of a command for importing the routes from the default routing table of router 130B or from the global routing table of router 130B. It should be mentioned that additional commands may be added. Explanation of the commands are shown between parenthesis:

ip vrf VRF-Remote/(define vrf VRF-Remote)

rd 1234:172/(rd stands for route distinguisher)

import ipv4 unicast map Global_To_VRF-Remote/(importing route from default routing table)

It should be mentioned that additional commands may be added and the commands above are only examples.

There are several reasons why the VRF-Remote imports the routing table(s) from the default routing table of router 130B. One reason is to allow routing of traffic from the roaming host node 121B to at least one host node (e.g., host node 131A) in another network (e.g., Subnet-3 131), except in the home network 120, when said at least one host node is the initiator of a communication with the roaming host node 121B. Another reason would be to establish a session between two ends of Tunnel-23. Yet another reason is to route traffic from the roaming host node 121B to at least one host node in another network, except in the home network 120, when the roaming host node 121B is the initiator of a communication with said at least one host node (e.g., host node 131A), or when the roaming host node 121B replies back to a traffic initiated by another host node (e.g. host node 131A).

It is appreciated that the previously described embodiments also apply when the VRF is created or configured in the router 130B of the visited network. In other words, the IP address of the roaming host node 121B is maintained the same in the subnet 121 of the visited network 130. The static route configured or created in the router 130B of the visited network 130 is also the same.

Using the concept of VRF, the static route may also be given as follows:

R-300 #
ip route vrf VRF-Remote 172.16.0.20/32

Also, the same conditions previously described are applicable when we use the VRF. In other words, the first condition that the static route should indicate a subnet within the IP address range of the subnet 121 of the home network 120 applies. This means that the subnet should be a sub-subnet of subnet 121. The second condition also applies i.e., the IP address of one or more host nodes in the subnet 121 of the home network 120 should be part of the IP address range of the sub-subnet, and the third condition is that the IP address of the roaming host node 121B should not be part of the IP address range associated with the sub-subnet, i.e., the IP address range of the sub-subnet indicated in the static route. The IP address of the roaming host node 121B is (172.16.0.199).

Referring back to the previous four examples and using the VRF concept, the following static routes may be used in the examples below:

Example 1

R-300 #
ip route vrf VRF-Remote 172.16.0.0/25→Tunnel23

Example 2

R-300 #
ip route vrf VRF-Remote 172.16.0.128/25→Tunnel23

Example 3

R-300 #
ip route vrf VRF-Remote 172.16.0.0/26→Tunnel23

Example 4

R-300 #
ip route vrf VRF-Remote 172.16.0.0/26→Tunnel23

All the static routes indicate a subnet within the IP address range of the subnet 121 of the home network 120. This means that the subnet indicated in the static route is a sub-subnet of subnet 121. The first condition is thus met, and for the same reasons as previously described, the static route of examples 1 and 3 fulfill conditions 2 and 3.

As demonstrated above, several advantages are achieved using the solution according to the embodiments herein. An advantage is that the roaming host node keeps its IP address in the network topology. Another advantage is that none of the routers need to change their routing information, except for the router in the home network and the router in the visited network. Yet another advantage is that the routing of traffic originated from external networks and destined to the roaming host node is not impacted by the moving of the host node from one network to another network. In addition, the solution is also applicable if the roaming host node is placed inside a site but connected to another router within that site.

Figure 3:
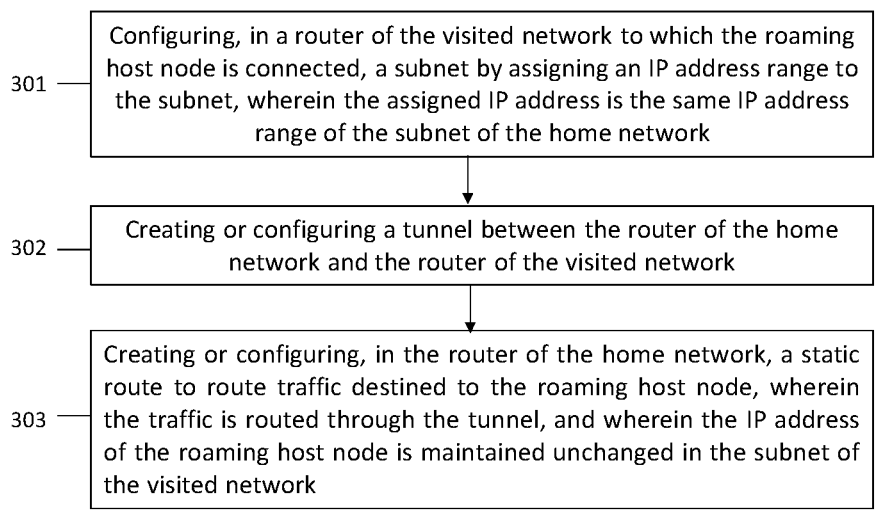
FIG. 3 illustrates a flowchart of a method according to some embodiments herein.

Referring to FIG. 3, there is illustrated a flowchart summarizing the method for enabling routing of traffic to/from a roaming host node roaming from a subnet of a home network to a visited network, in accordance with some embodiments described earlier. As shown, the main steps comprise:

(301) configuring, in a router of the visited network to which the roaming host node is connected (or wherein the router of the visited network is connectable to the roaming host node), a subnet by assigning an IP address range to the subnet, wherein the assigned IP address is the same IP address range of the subnet of the home network.

(302) creating or configuring a tunnel between the router of the home network and the router of the visited network; and (303) creating or configuring, in the router of the visited home network, a static route to route traffic destined to the roaming host node, wherein the traffic is routed through the tunnel, and wherein the IP address of the roaming host node is maintained unchanged in the subnet of the visited network.

The method further comprises: creating or configuring, in the router of the visited network, a static route to route traffic, destined to a host node in the subnet of the home network, from the roaming host node, wherein the traffic is routed through the tunnel.

Alternatively, the method comprises: creating or configuring, in the router of the visited network, a static route to route traffic, destined to a host node in the subnet of the home network, from the roaming host node, wherein the traffic is routed through the tunnel. The static route indicates a subnet within the IP address range of the subnet of the home network. The IP address of the host node in the subnet of the home network is part of the IP address range associated with the subnet indicated in the static route; and the IP address of the roaming host node is not part of the IP address range associated with the subnet indicated in static route.

As previously described, the method may further comprise, creating or configuring a VRF in the router of visited network; assigning an interface of the router in the visited network to the VRF, wherein none of the other interfaces in the router of the visited network is part of the VRF; assigning a tunnel end point on the router in the visited network to the VRF; and importing routes from at least one routing table of the router in the visited network to a VRF table.

Importing routes to the VRF table is performed for establishing a session between two end points of the tunnel. Further, importing routes to the VRF table is performed for routing traffic from the roaming host node to at least one host node in another network except in the home network, when said at least one host node is the initiator of a communication with the roaming host node.

In addition, importing routes to the VRF table is performed for routing traffic from the roaming host node to at least one host node in another network except in the home network, when the roaming host node is the initiator of a communication with said at least one host node.

There is also provided a system for enabling routing of traffic to/from a roaming host node roaming from a subnet of a home network to a visited network, wherein the roaming host node is assigned an IP address in the home network, the system comprising a router in the visited network to which the roaming host node is connected (i.e., the roaming host node is connectable to the router of the visited network), and further comprises a router in the home network. In the system, the router of the visited network is adapted to configure a subnet by assigning an IP address range to the subnet, wherein the assigned IP address range is the same IP address range of the subnet of the home network. A tunnel is also created between a router of the home network and the router of the visited network. The router of the home network is adapted to create or configure a static route to route traffic destined to the roaming host node wherein the traffic is routed through the created or configured tunnel, and wherein the IP address of the roaming host node is maintained unchanged in the subnet of the visited network.

As previously described, the router of the visited network is adapted to create or configure a static route to route traffic, destined to a host node in the subnet of the home network, from the roaming host node, wherein the traffic is routed through the created or configured tunnel. The router of the visited network is further adapted to create or configure a static route to route traffic, destined to a host node in the subnet of the home network, from the roaming host node, wherein the traffic is routed through the created or configured tunnel; and wherein, the static route indicates a subnet within the IP address range of the subnet of the home network; and the IP address of the host node in the subnet of the home network is part of the IP address range associated with the subnet indicated in the static route. The IP address of the roaming host node is not part of the IP address range associated with the subnet indicated in static route.

The router of the visited network is adapted to: create or configure a VRF; assign an interface of the router of the visited network to the VRF, wherein none of the other interfaces in the router of the visited network is part of the VRF; assign a tunnel end point on the router of the visited network to the VRF; and import routes from at least one routing table of the router of the visited network to a VRF table. The reasons why the routes are imported to the VRF table have already been described.

There is also provided a computer program comprising instructions which when executed on at least one processor of the router of the visited network, cause the at least one processor (of the router) to carry out the method or procedure related to the router of the visited network, as previously described, related. The router (device) of the visited network comprises a processor and a memory, the memory containing instructions executable by said processor whereby the router of the visited network is operative/configured to perform the procedure previously described. Further, there is provided a computer program comprising instructions which when executed on at least one processor of the router of the home network, cause the at least said one processor (of the router of the home network) to carry out the method or procedure related to the router of the home network, as previously described. The router (device) of the home network comprises a processor and a memory, the memory containing instructions executable by said processor whereby the router of the home network is operative/configured to perform the procedure previously described.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A method for enabling routing of traffic to/from a roaming host node roaming from a subnet of a home network to a visited network, wherein the roaming host node is assigned an IP address in the home network, the method comprising:
    configuring, in a router of the visited network to which the roaming host node is connected, a subnet by assigning an Internet Protocol (IP) address range to the subnet, wherein the assigned IP address range is the same IP address range of the subnet of the home network;
    creating or configuring a tunnel between a router of the home network and the router of the visited network;
    creating or configuring, in the router of the home network, a static route to route traffic destined to the roaming host node wherein the traffic is routed through the tunnel, and wherein the IP address of the roaming host node is maintained unchanged in the subnet of the visited network; and
    creating or configuring, in the router of the visited network, a static route to route traffic, destined to a host node in the subnet of the home network, from the roaming host node, wherein the traffic is routed through the tunnel:
        the static route indicating a subnet within the IP address range of the subnet of the home network;
        the IP address of the host node in the subnet of the home network is part of the IP address range associated with the subnet indicated in the static route; and
        the IP address of the roaming host node is not part of the IP address range associated with the subnet indicated in the static route.

2. The method according to claim 1, further comprising:
    creating or configuring a Virtual Route Forwarder, (VRF) in the router of visited network;
    assigning an interface of the router in the visited network to the VRF, wherein none of the other interfaces in the router of the visited network is part of the VRF;
    assigning a tunnel end point on the router in the visited network to the VRF; and
    importing routes from at least one routing table of the router in the visited network to a VRF table.

3. The method according to claim 2, wherein importing routes to the VRF table is performed for establishing a session between two end points of the tunnel.

4. The method according to claim 2, wherein importing routes to the VRF table is performed for routing traffic from the roaming host node to at least one host node in another network except in the home network, when said at least one host node is the initiator of a communication with the roaming host node.

5. The method according to claim 2, wherein importing routes to the VRF table is performed for routing traffic from the roaming host node to at least one host node in another network except in the home network, when the roaming host node is the initiator of a communication with said at least one host node.

6. A system for enabling routing of traffic to/from a roaming host node roaming from a subnet of a home network to a visited network, wherein the roaming host node is assigned an IP address in the home network, the system comprising a router in the visited network to which the roaming host node is connected, and further comprises a router in the home network; wherein:
    the router of the visited network is adapted to:
        configure a subnet by assigning an IP address range to the subnet, wherein the assigned IP address range is the same IP address range of the subnet of the home network; and
        create or configure a tunnel between a router of the home network and the router of the visited network;
    the router of the home network is adapted to create or configure a static route to route traffic destined to the roaming host node wherein the traffic is routed through the created or configured tunnel, and wherein the IP address of the roaming host node is maintained unchanged in the subnet of the visited network; and
    the router of the visited network is adapted to create or configure a static route to route traffic, destined to a host node in the subnet of the home network, from the roaming host node, wherein the traffic is routed through the tunnel:
        the static route indicating a subnet within the IP address range of the subnet of the home network;
        the IP address of the host node in the subnet of the home network is part of the IP address range associated with the subnet indicated in the static route; and
        the IP address of the roaming host node is not part of the IP address range associated with the subnet indicated in the static route.

7. The system according to claim 6, wherein the router in the visited network is adapted to:
    create or configure a Virtual Route Forwarder (VRF);
    assign an interface of the router of the visited network to the VRF, wherein none of the other interfaces in the router of the visited network is part of the VRF;
    assign a tunnel end point on the router of the visited network to the VRF; and
    import routes from at least one routing table of the router of the visited network to a VRF table.

8. The system according to claim 7, wherein the import of the routes to the VRF table is performed for establishing a session between two end points of the tunnel.

9. The system according to claim 7, wherein the import of the routes to the VRF table is performed for routing traffic from the roaming host node to at least one host node in another network except in the home network, when said at least one host node is the initiator of a communication with the roaming host node.

10. The system according to claim 7, wherein the import of the routes to the VRF table is performed for routing traffic from the roaming host node to at least one host node in another network except in the home network, when the roaming host node is the initiator of a communication with said at least one host node.

\* \* \* \* \*